United States Patent Office 2,734,092
Patented Feb. 7, 1956

2,734,092

ISOMERIZATION OF CIS-DECALIN

Abraham Schneider, Philadelphia, and William K. Conn, Springfield, Pa., assignors to Sun Oil Company, Philadelphia, Pa., a corporation of New Jersey No Drawing. Application October 1, 1952, Serial No. 312,656

7 Claims. (Cl. 260—666)

This invention relates to the isomerization of decalin and is specifically directed to the isomerization of cis-decalin to trans-decalin.

Decahydronaphthalene, commonly known as "decalin," exists in the form of cis-decalin, trans-decalin, and mixtures thereof, both forms being relatively stable. Decalin is obtained from hydrocarbon oils, by the hydrogenation of naphthalene, and from coal tar distillation processes. Depending on the source, decalin may be principally the cis- or trans- form, or may be a mixture thereof.

Decalin has many uses, such as a substitute for turpentine in the paint and varnish industry, in the manufacture of cosmetics, as a solvent in processing fats and oils, and the like. In the separation of decalin from such compositions it is frequently necessary to employ distillation or evaporation, in which event it is advantageous to employ trans-decalin because of its relatively low boiling point. However, no commercially feasible process has heretofore been described for the isomerization of cis-decalin to trans-decalin, although it is known that the transformation can be made under relatively drastic conditions, including high temperature, through the use of a catalyst such as aluminum bromide. Under such drastic conditions considerable degradation of decalin to gas and other low boiling products is observed, or the catalyst becomes deactivated and requires regeneration or replacement.

An object of the present invention is to provide a process for isomerizing cis-decalin to trans-decalin. A further object is to provide a process for converting cis-decalin to trans-decalin without degradation of the decalin to lower boiling products. Other objects will be apparent from the following specification.

It has now been found that by contacting a mixture of cis-decalin, an olefin and an isoparaffin with hydrogen fluoride at a temperature of from 0 to 120° C., the cis-decalin is rapidly converted to trans-decalin. The boiling points of trans-decalin and cis-decalin, 185° C. and 194° C. respectively are such that the trans-decalin can be readily separated from unconverted cis-decalin by distillation.

To illustrate an embodiment of the invention, a mixture of cis-decalin, an olefin, an isoparaffin and hydrogen fluoride are agitated in liquid phase for from one minute to 2 hours. The acid phase is separated from the hydrocarbon phase, such as by decanting, and the separated hydrocarbons distilled to separate the trans-decalin product and unreacted cis-decalin. Other hydrocarbons formed in the process, as hereinafter described, can also be separated in the distillation process if desired.

It is not essential to secure substantial isomerization that an isoparaffin be employed. However, in the absence of an isoparaffin a quantity of decalin is converted to sludge and is thus lost. Isobutane is the preferred isoparaffin to employ. Other isoparaffins which may be employed are those which have a hydrogen atom attached to a tertiary carbon atom, such as 2-methyl butane; 2-methyl pentane; 3-methyl pentane; 2,3-dimethyl butane; the isohexanes, isoheptanes, iso-octanes, and homologues and mixtures thereof.

It is essential to the process of the present invention that an olefin be employed. Isobutylene is the preferred olefin, but other olefins such as propylene, butene-1, butene-2, 2-methyl butene-1, 2-methyl butene-2, 3-methyl pentene-2, 3,4-dimethyl pentene-2, cyclopentene, methylcyclopentene, cyclohexene, and homologues and mixtures thereof may be employed. It is preferred to select the isoparaffin and olefin so that the isoparaffin will not interfere with the subsequent separation of trans-decalin, and so that any reaction of the isoparaffin and olefin, either with themselves or with each other, that may occur as hereinafter described under the conditions of the present process, will not form products which will so interfere. Such selection can be made by those skilled in the art in light of the teachings of the present specification.

As above stated, mild conditions of operation are employed. The temperature of operation can be varied from 0° C. to 120° C., but is preferably maintained from 20° C. to 50° C. At lower temperatures substantial reaction is not obtained, and at higher temperatures degradation of decalin to lower molecular weight compounds is observed. The pressure to employ is not critical, it being sufficient to maintain the pressure so that the components of the reaction mixture, including hydrogen fluoride, are maintained in the liquid phase. Within the temperature range employed, the pressure will usually be from 10 to 500 p. s. i. g. In general, practical considerations dictate a contact time of from 1 minute to 2 hours, and longer contact times give no substantial advantage. It is characteristic of the present process, when preferred conditions of operation are observed, that reaction occurs practically instantaneously, i. e., reaction is complete as soon as the reactants are agitated together.

In a further embodiment of the process, ethylene is employed as the olefin and boron trifluoride is employed in conjunction with hydrogen fluoride. In the presence of both $BF_3$ and hydrogen fluoride, the present process is operative using ethylene as the olefin. In this embodiment the conditions of reaction are as herein defined for higher molecular weight olefins. The amount of boron trifluoride to employ should be maintained within the range of from about 2 to 50 percent by weight based on the amount of hydrogen fluoride employed.

It is characteristic of the process of the present invention that the olefin employed is converted in major amounts to an isoparaffin having the same number of carbon atoms as the olefin, except when ethylene or propylene is employed as the olefin, in which event they are converted to the corresponding paraffins, ethane and propane, respectively. Other side reactions occur but do not interfere with the main reaction, which is the isomerization of cis-decalin to trans-decalin. Side reactions which may be observed include, for example, dimerization of the olefin, self-alkylation of the isoparaffin, and disproportionation when a relatively high molecular weight isoparaffin is employed.

As above stated, it is essential to the process that an olefin be present as a component of the reaction mixture. The mole ratio of olefin to cis-decalin should be maintained within the range of 0.05 to 1.0, and preferably is maintained within the range of 0.2 to 0.5. The mole ratio of isoparaffin to cis-decalin advantageously is maintained within the range of 0.5 to 10 in order to obtain substantial yields of trans-decalin and to prevent degradation of decalin to lower molecular weight products. The quantity of hydrogen fluoride to employ can be varied from about 50 to 600 weight percent based on the quantity of cis-decalin.

The following examples illustrate an embodiment of the process, in which "parts" refers to parts by weight based on the charge materials:

Example 1

Into a reaction vessel were introduced 100 parts isobutane, 49.2 parts of cis-decalin (100% pure by infrared analysis) and 74.2 parts hydrogen fluoride. At room temperature, about 22° C., 10 parts of isobutylene was then introduced into the vessel, whereupon a small amount of heat was immediately generated causing the temperature of the mixture to increase to about 26° C. The pressure was about 100 p. s. i. g. The reaction mixture was stirred for about 15 minutes, cooled, and the hydrogen fluoride layer separated by decanting.

The hydrocarbon layer, 159.2 parts, was separated into its components by distillation. There was recovered 101 parts of isobutane, consisting of the isobutane originally present and the isobutane formed by saturation of isobutylene. There was also recovered about 40 parts of a mixture of decalin isomers containing about 4 parts of trans-decalin as shown by infrared analysis. The isomers were separated by distillation, about 4 parts of trans-decalin being obtained. The remaining hydrocarbon products consisted of octanes formed by dimerization of isobutylene and self-alkylation of isobutane, and a small quantity of high boiling material. The octanes were highly branched and suitable for use as a component of fuels having a high octane number for use in internal combustion engines.

When the mole ratio of olefin to cis-decalin is increased, increased yields of the trans-isomer is observed.

In the foregoing example no gas, i. e., hydrocarbons boiling below isobutane was formed, and no olefins or aromatics were formed. Hydrogen fluoride recovery was practically quantitative, and the recovered catalyst was not contaminated so that it could be recycled to the process without purification or regeneration.

Example 2

The procedure of Example 1 was substantially repeated with the same reactants except that no olefin was employed. All of the components of the reaction mixture were recovered unchanged in practically quantitative amounts.

In performing the process, it is advantageous to introduce the olefin into a mixture of the remaining components of the reaction mixture, or to introduce hydrogen fluoride into a mixture of the remaining components. Such operation is especially advantageous where batchwise operation is employed. For continuous operation it is advantageous to admix two streams of components, one containing the olefin and either cis-decalin or the isoparaffin, and the other containing hydrogen fluoride and either cis-decalin or isoparaffin, depending on which was not employed with the olefin. It is not advisable to admix the olefin and hydrogen fluoride in the absence of the remaining components of the reaction mixture.

The process of the present invention has been described in terms of isomerizing cis-decalin to trans-decalin, which is the preferred embodiment. Substantially pure cis-decalin can be employed, but mixtures of cis- and trans-decalin preferably containing at least 50% of the cis-isomer give good results by increasing the concentration of the trans-isomer for subsequent separation. A small amount of aromatic hydrocarbons, up to about 5%, does not deleteriously affect the process, but preferably the aromatic content is maintained below 1%. Other hydrocarbons which are decalins, i. e., which have a decalin structure may be employed. By "decalin structure," as used herein, is meant a saturated bicyclic hydrocarbon wherein the rings are fused, each ring containing 6 carbon atoms. Such decalins have alkyl substituents attached to ring carbon atoms, such as 2-methyl decalin and 2,6-dimethyl decalin. In a broad embodiment, therefore, the invention provides a process for converting a cis-decalin to a trans-decalin.

The invention claimed is:

1. Process for producing trans-decalin which comprises forming a liquid phase reaction mixture consisting essentially of cis-decalin, an isoparaffin, an olefin and hydrogen fluoride, subjecting said mixture to a temperature of from 0° C. to 120° C. for from one minute to two hours to convert a portion of said cis-decalin to trans-decalin without the formation of any sludge, and separating trans-decalin from the reaction mixture.

2. Process according to claim 1 wherein said olefin is ethylene.

3. Process according to claim 1 wherein said olefin is isobutylene.

4. Process according to claim 1 wherein said olefin is propylene.

5. Process according to claim 1 wherein said isoparaffin is isobutane.

6. Process according to claim 1 wherein said isoparaffin is isopentane.

7. Process for producing trans-decalin which comprises forming a liquid phase mixture consisting essentially of cis-decalin, an isoparaffin and hydrogen fluoride wherein the mole ratio of isoparaffin to cis-decalin is from 0.5 to 10, and introducing an olefin into said liquid phase mixture while maintaining the temperature within the range of from 0° C. to 120° C., whereby no sludge is produced and a portion of said cis-decalin is isomerized to trans-decalin, and separating trans-decalin from the reaction mixture.

References Cited in the file of this patent

UNITED STATES PATENTS 2,632,777    Pines _____ Mar. 24, 1953